(12) United States Patent
Iwakata et al.

(10) Patent No.: US 7,883,021 B2
(45) Date of Patent: Feb. 8, 2011

(54) CONNECTING PART FOR MOUNTING IC CHIP, ANTENNA CIRCUIT, IC INLET, IC TAG AND METHOD OF ADJUSTING CAPACITANCE

(75) Inventors: Yuichi Iwakata, Tokyo (JP); Taiga Matsushita, Tokyo (JP)

(73) Assignee: Lintec Corporation, Tokyo (JP)

( * ) Notice: Subject to any disclaimer, the term of this patent is extended or adjusted under 35 U.S.C. 154(b) by 361 days.

(21) Appl. No.: 11/969,177

(22) Filed: Jan. 3, 2008

(65) Prior Publication Data
US 2008/0164326 A1 Jul. 10, 2008

(30) Foreign Application Priority Data
Jan. 4, 2007 (JP) ............................. 2007-000126

(51) Int. Cl.
*G06K 19/06* (2006.01)
(52) U.S. Cl. .......................... 235/492; 235/380; 235/451
(58) Field of Classification Search ................. 235/492, 235/380, 441, 451, 487
See application file for complete search history.

(56) References Cited
U.S. PATENT DOCUMENTS
7,701,350 B2* 4/2010 Sakama et al. ........... 340/572.7

| 2004/0026519 A1* | 2/2004 | Usami et al. ................. 235/492 |
| 2004/0177492 A1 | 9/2004 | Eckstein et al. |
| 2004/0201522 A1 | 10/2004 | Forster |

FOREIGN PATENT DOCUMENTS
JP 2004-078768 3/2004
WO WO 2006/009935 A1 1/2006

OTHER PUBLICATIONS
European Patent Office, European Search Report on Application No. 08000062.3-1248, dated Mar. 20, 2008.
European Patent Office, European Communication for Application No. 08000062.3, mail date Jul. 8, 2009.

* cited by examiner

*Primary Examiner*—Edwyn Labaze
(74) *Attorney, Agent, or Firm*—SoCal IP Law Group LLP; Steven C. Sereboff; John E. Gunther

(57) ABSTRACT

When at least one IC chip is mounted on electrode parts, a connecting part for mounting IC chip according to the present invention can control an area of an overlap between the electrode parts on which each IC chip is mounted and each IC chip according to a mounting position of each IC chip. An antenna circuit according to the present invention includes a connecting part for mounting IC chip and an antenna unit of the present invention. An IC inlet according to the present invention includes at least one IC chip on the connecting part for mounting IC chip of the antenna circuit of the present invention.

9 Claims, 7 Drawing Sheets

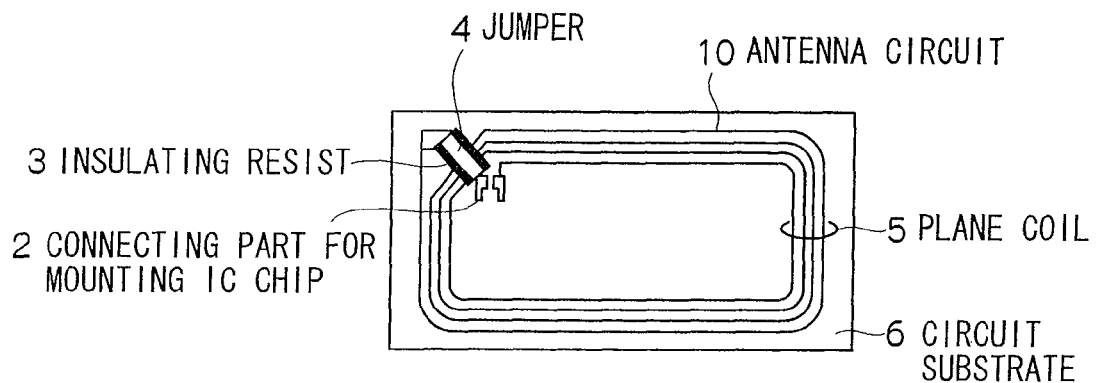
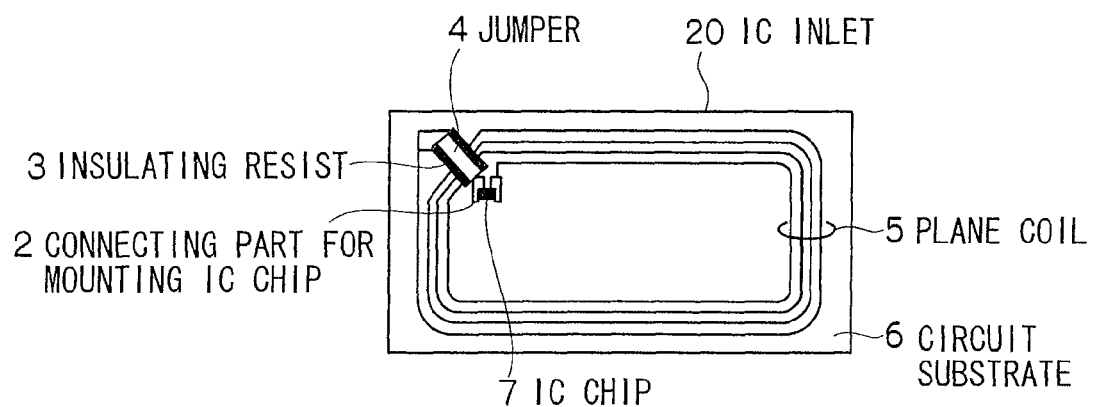

FIG. 3
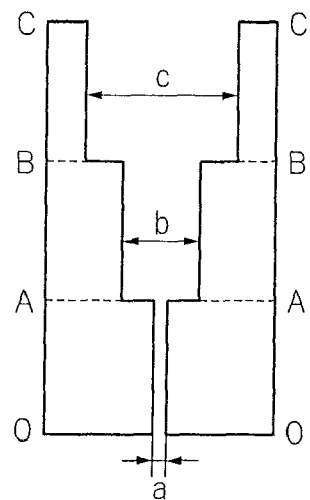
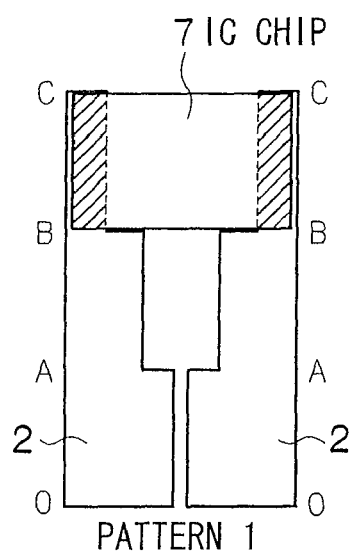
PATTERN 1
FIG.4A
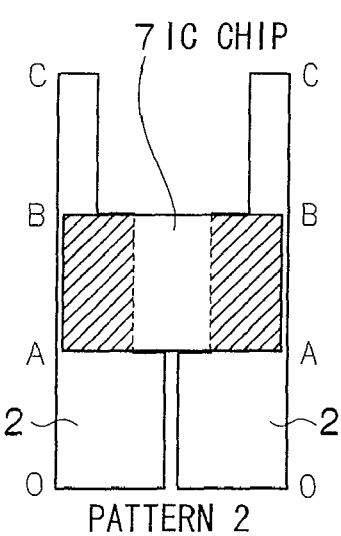
PATTERN 2
FIG.4B
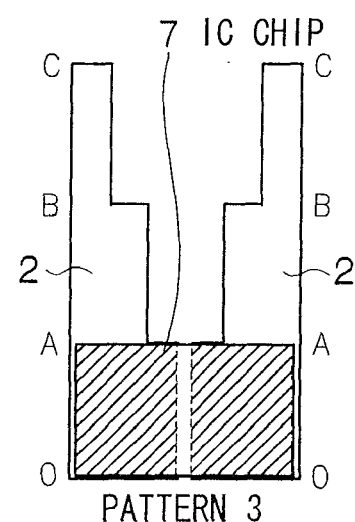
PATTERN 3
FIG.4C

PATTERN 1

PATTERN 2

PATTERN 3

CONNECTING PART FOR MOUNTING IC CHIP, ANTENNA CIRCUIT, IC INLET, IC TAG AND METHOD OF ADJUSTING CAPACITANCE

RELATED APPLICATION INFORMATION

This application claims, under 35 USC 119, priority of Japanese Application No. 2007-126 filed on Jan. 4, 2007.

BACKGROUND OF THE INVENTION

Description of the Background Art

The present invention relates to a connecting part for mounting IC chip, an antenna circuit, an IC inlet, an IC tag and a method of adjusting capacitance.

A non-contact IC tag receives electric power by acquiring resonance frequency which resonates with transmission frequency of a reader-writer. The fed electric power drives an IC chip, and enables reading/writing of data. To feed sufficient electric power, transmission frequency needs to resonate with resonance frequency.

When the IC tag is mass-produced, variation in resonance frequency may occur due to variation generated in a manufacturing process of the IC chip or an antenna circuit.

For this reason, at manufacturing of the IC tag, it is necessary to make an adjustment so as to obtain resonance frequency resonating with transmission frequency.

As represented by the following relational expression (1), the resonance frequency f is determined by capacitance C of the whole IC inlet and an inductance L of the antenna circuit.

$$f = 1/2\pi(LC)^{1/2} \quad (1)$$

Conventional methods of adjusting the resonance frequency at manufacturing of the IC tag include, for instance, a method of providing an adjusting capacitor in a circuit and cutting a part of the adjusting capacitor after mounting of the IC chip. Moreover, another method includes a method of providing a plurality of adjusting capacitors in a circuit and selecting an optimum path while varying a mounting site of the IC chip as described in Japanese patent Laid-Open No. 2004-78768.

However, since the conventional methods of adjusting resonance frequency using the adjusting capacitor requires a trimming step of adjusting frequency after mounting of the IC chip, the number of steps of manufacturing the IC tag is increased.

Moreover, since the latter conventional method of selecting an optimum path for adjustment has the step of selecting the mounting site of the IC chip among the plurality of adjusting capacitors, there is another problem that options for adjustment are limited.

SUMMARY OF THE INVENTION

An object of the present invention is to adjust capacitance of an IC chip to be mounted with a simple structure while making a manufacturing process more efficient.

When at least one IC chip is mounted on electrode parts, a connecting part for mounting IC chip at a first aspect can control an area of an overlap between the electrode parts on which each IC chip is mounted and each IC chip according to the mounting position of each IC chip.

In a connecting part for mounting IC chip at a second aspect, the electrode parts at the first aspect have different spaces between the electrode parts in the longitudinal direction of the electrode parts.

In a connecting part for mounting IC chip at a third aspect, wherein the electrode parts at the first or second aspect are shaped to be symmetrical between the electrode parts.

In a connecting part for mounting IC chip at a fourth aspect, the electrode parts at the first or second aspect are shaped to be asymmetrical between the electrode parts.

An antenna circuit at a fifth aspect includes a connecting part for mounting IC chip which, when at least one IC chip is mounted on electrode parts, can control an area of an overlap between the electrode parts on which each IC chip is mounted and each IC chip according to the mounting position of each IC chip; and an antenna unit.

In an antenna circuit at a sixth aspect, the electrode parts at the fifth aspect have different spaces between the electrode parts in the longitudinal direction of the electrode parts.

In an antenna circuit at a seventh aspect, the electrode parts at the fifth or sixth aspect are shaped to be symmetrical between the electrode parts.

In an antenna circuit at an eighth aspect, the electrode parts at the fifth or sixth aspect are shaped to be asymmetrical between the electrode parts.

An IC inlet at a ninth aspect includes a connecting part for mounting IC chip which, when at least one IC chip is mounted on electrode parts, can control an area of an overlap between the electrode parts on which each IC chip is mounted and each IC chip according to the mounting position of each IC chip; at least one IC chip mounted on the connecting part for mounting IC chip; and an antenna unit.

In an IC chip inlet at a tenth aspect, the electrode parts at the ninth aspect have different spaces between the electrode parts in the longitudinal direction of the electrode parts.

In an IC inlet at an eleventh aspect, the electrode parts at the ninth or tenth aspect are shaped to be symmetrical between the electrode parts.

In an IC inlet at a twelfth aspect, the electrode parts at the ninth or tenth aspect are shaped to be asymmetrical between the electrode parts.

An IC tag at a thirteenth aspect includes an IC inlet including a connecting part for mounting IC chip which, when at least one IC chip is mounted on electrode parts, can control an area of an overlap between the electrode parts on which each IC chip is mounted and each IC chip according to the mounting position of each IC chip; at least one IC chip mounted on the connecting part for mounting IC chip; and an antenna unit.

In an IC tag at a fourteenth aspect, the electrode parts at the thirteenth aspect have different spaces between the electrode parts in the longitudinal direction of the electrode parts.

In an IC tag at a fifteenth aspect, the electrode parts at the thirteenth or fourteenth aspect are shaped to be symmetrical between the electrode parts.

In an IC tag at a sixteenth aspect, the electrode parts at the thirteenth or fourteenth aspect are shaped to be asymmetrical between the electrode parts.

A method of adjusting capacitance at a seventeenth aspect includes, when at least one IC chip is mounted on electrode parts of a connecting part for mounting IC chip, a step of adjusting a capacitance determined by each IC chip and the electrode parts by varying an area of an overlap between the electrode parts on which each IC chip is mounted and each IC chip according to the mounting position of each IC chip.

At the above-mentioned aspects, the capacitance of the IC inlet can be adjusted with a simple structure while making a manufacturing process more efficient. As a result, resonance frequency which enables supply of sufficient electric power can be adjusted, thereby optimizing functions of the IC tag.

DESCRIPTION OF THE DRAWINGS

FIG. 1 is a structure diagram of an antenna circuit in accordance with a first embodiment;

FIG. 2 is a structure diagram of an IC inlet in accordance with the first embodiment;

FIG. 3 is a view showing the shape of electrode parts of a connecting part for mounting IC chip in accordance with the first embodiment;

FIG. 4A is a view showing a difference in an area S of an overlap between electrode parts and an IC chip in a state where a mounting position of the IC chip in accordance with the first embodiment is varied (1);

FIG. 4B is a view showing difference in the area S of the overlap between the electrode parts and the IC chip in the state where the mounting position of the IC chip in accordance with the first embodiment is varied (2);

FIG. 4C is a view showing difference in the area S of the overlap between the electrode parts and the IC chip in the state where the mounting position of the IC chip in accordance with the first embodiment is varied (3);

Figure 5:
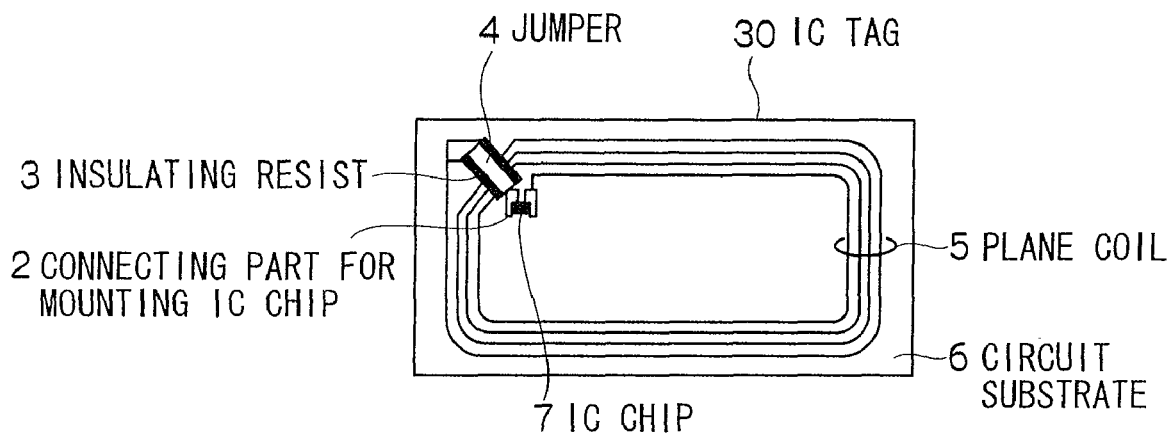
FIG. 5 is a structure diagram of an IC tag in accordance with the first embodiment.

DESCRIPTION OF THE PREFERRED EMBODIMENTS (A) First Embodiment

Hereinafter, a connecting part for mounting IC chip, an antenna circuit, an IC inlet, an IC tag and a method of adjusting capacitance in accordance with a first embodiment of the present invention will be described referring to drawings.

(A-1) Structure of First Embodiment (A-1-1) Structure of Antenna Circuit and IC Inlet FIG. 1 is a structure diagram showing a structure of the antenna circuit having the connecting part for mounting IC chip in accordance with the first embodiment. FIG. 2 is a structure diagram showing a structure of the IC inlet in accordance with the first embodiment.

In FIG. 1, the antenna circuit 10 includes a plane coil (antenna unit) 5, a jumper 4, an insulating resist 3 and a connecting part for mounting IC chip 2 on a plane of a circuit substrate 6. The antenna circuit 10 shown in FIG. 1 is an opened circuit and becomes a closed circuit when an IC chip is mounted on the connecting part for mounting IC chip 2.

In FIG. 2, an IC inlet 20 refers to a circuit in a state where an IC chip 7 is mounted on the connecting part for mounting IC chip 2 of the antenna circuit 10 shown in FIG. 1. In the first embodiment, although the single antenna circuit 10 is equipped with one IC chip 7, a plurality of IC chips 7 may be mounted.

As the circuit substrate 6, a synthetic resin film made of polyethylene, polypropylene, polyethylene terephthalate, polyvinyl chloride, polyimide or polycarbonate and a sheet material such as paper including woodfree paper, coated paper, glassine paper, nonwoven fabric may be employed. The thickness of the circuit substrate 6 is not specifically limited, preferably 5 to 300 μm, more preferably 10 to 200 μm.

The plane coil 5 forming the antenna unit mainly functions as an antenna and serves to feed electric power. The plane coil 5 can be formed by using a method of winding a coated copper wire in the shape of a coil, a method of printing a conductive paste in the shape of a coil, a method of forming a conductive metal layer which is made of copper or the like laminated on the circuit substrate 6 to be shaped like a coil by etching or a similar method. Metal particles of gold, silver, nickel or the like dispersed in a binder can be used as the conductive paste. Polyester resin, polyurethane resin, epoxy resin can be used as the binder. The number of turns, width and spacing circuit wire of the plane coil 5 can be arbitrarily set according to desirable resonance frequency.

An end (outermost end) located on an outer side of the plane coil 5 is connected to one electrode part of the connecting part for mounting IC chip 2 which is located on an inner side of the plane coil 5 via the jumper 4. An end (innermost end) located on the inner side of the plane coil 5 is connected to the other electrode part of the connecting part for mounting IC chip 2.

The jumper 4 serves to electrically connect the outer end and the inner end of the plane coil 5. A conductive paste or a conductive ink having dispersed metal particles of gold, silver, nickel or the like can be used as the jumper 4.

The insulating resist 3 is disposed below the jumper 4. The insulating resist 3 achieves isolation between the jumper 4 and each loop of the plane coil 5. For example, insulating resin having acrylic resin, urethane resin, acrylic urethane resin as main ingredients can be used as the insulating resist 3.

The connecting part for mounting IC chip 2 is formed of a pair of electrode parts on which the IC chip 7 is mounted. Electrode parts of the connecting part for mounting IC chip 2 may be made of a conductive material such as metal such as copper and aluminum or conductive ink of silver paste or the like.

When the IC chip 7 is mounted on the electrode parts of the connecting part for mounting IC chip 2, the IC chip 7 is connected to the electrode parts of the connecting part for mounting IC chip 2 by using a connecting material. Solder, anisotropic conductive adhesive, anisotropic conductive adhesive film or the like can be used as the connecting material. A material including epoxy resin having dispersed metal particles therein as main ingredients can be used as the anisotropic conductive adhesive and the anisotropic conductive adhesive film.

The electrode parts of the connecting part for mounting IC chip 2 is shaped so that an area of an overlap between the electrode parts of the connecting part for mounting IC chip 2 and the IC chip 7 can be adjusted by changing a mounting position of the IC chip 7 in mounting the IC chip 7.

Since the electrode parts of the connecting part for mounting IC chip 2 is shaped as described above, the area of the overlap between the electrode parts of the connecting part for mounting IC chip 2 and the IC chip 7 can be changed by changing the mounting position of the IC chip 7 in mounting the IC chip 7. Thus, capacitance (mounting capacitance of installing state with IC chip) $C_3$ generating in the overlap between the electrode parts of the connecting part for mounting IC chip 2 and the IC chip 7 can be adjusted. As a result, the IC inlet can be adjusted to have desired resonance frequency.

Generally, when the IC chip 7 is mounted on the electrode parts of the connecting part for mounting IC chip 2, an area S of the overlap between the electrode parts of the connecting part for mounting IC chip 2 and the IC chip 7 correlates with a mounting capacitance $C_3$ depending on the mounted chip 7 and the electrode parts according to the following relational expression. $\in_0$ represents a dielectric constant in vacuum, $\in_r$ represents a relative dielectric constant and d represents a distance between the IC chip 7 and the electrode parts.

$$C_3 = \in_0 \in_r (S/d) \quad (2)$$

That is, the mounting capacitance $C_3$ depending on the mounted chip 7 and the electrode parts is proportional to the area S of the overlap between the electrode parts of the connecting part for mounting IC chip 2 and the IC chip 7 in the above expression (2). As explained referring to the above expression (1), the resonance frequency f is determined by adjusting the capacitance C of the overall IC inlet.

In the actual IC inlet, the capacitance C of the overall IC inlet can be represented as a sum of the following components. Given that the original capacitance of the IC chip is $C_1$, stray capacitance generated from the antenna circuit is $C_2$ and the mounting capacitance is $C_3$, the following relational expression is satisfied.

$$C = C_1 + C_2 + C_3 \quad (3)$$

When the IC chip 7 is mounted, by changing the mounting position of the IC chip 7 to adjust the area S of the overlap between the electrode parts of the connecting part for mounting IC chip 2 and the IC chip 7, the capacitance C of the overall IC inlet can be adjusted.

That is, the capacitance C of the overall IC inlet can be increased by making the area S larger and the capacitance C of the overall IC inlet can be decreased by making the area S smaller.

FIG. 3 is a view showing the shape of the electrode parts of the connecting part for mounting IC chip 2. FIGS. 4A to 4C are views showing a difference in the area S in a state where the mounting position of the IC chip 7 mounted on the electrode parts of the connecting part for mounting IC chip 2 shown in FIG. 3 is varied.

In FIG. 3, the shape of the electrode parts of the connecting part for mounting IC chip 2 varies depending on the space between both of the electrode parts in the longitudinal direction of the electrode parts of the connecting part for mounting IC chip 2. That is, the electrode parts of the connecting part for mounting IC chip 2 is symmetric so that a space between both of the electrode parts in a section from a point O to a point A is a space a, a space between both of the electrode parts in a section from the point A to a point B is a space b and a space between both of the electrode parts in a section from the point B to a point C is a space c.

FIG. 4A shows a mounting pattern (pattern 1) in a case where the IC chip 7 is mounted in the section from the point B to the point C of the electrode parts of the connecting part for mounting IC chip 2. FIG. 4B shows a mounting pattern (pattern 2) in a case where the IC chip 7 is mounted in the section from the point A to the point B of the electrode parts of the connecting part for mounting IC chip 2. FIG. 4C shows a mounting pattern (pattern 3) in a case where the IC chip 7 is mounted in the section from the point O to the point A of the electrode parts of the connecting part for mounting IC chip 2.

Thus, when the mounting position of the IC chip 7 is varied, as shown in FIGS. 4A to 4C, the area S (hatched portion in FIGS. 4A to 4C) of the overlap between the electrode parts of the connecting part for mounting IC chip 2 and the IC chip 7 can be increased in the order of FIG. 4A, FIG. 4B and FIG. 4C. Consequently, the mounting capacitance $C_3$ can be made larger in this order.

When the connecting part for mounting IC chip 2 having a predetermined shape is provided in advance in this manner, the area S can be easily adjusted merely by changing the mounting position of the IC chip 7 in mounting the IC chip 7. As a result, the capacitance of the whole IC inlet can be adjusted.

Although the IC chip 7 is mounted in the section with the uniform space between both of the electrode parts in FIGS. 4A to 4C, the IC chip 7 may be mounted over sections with different spaces between both of the electrode parts.

(A-1-2) Structure of IC Tag

Next, structure of the IC tag in accordance with a first embodiment will be described referring to drawings.

Figure 6:
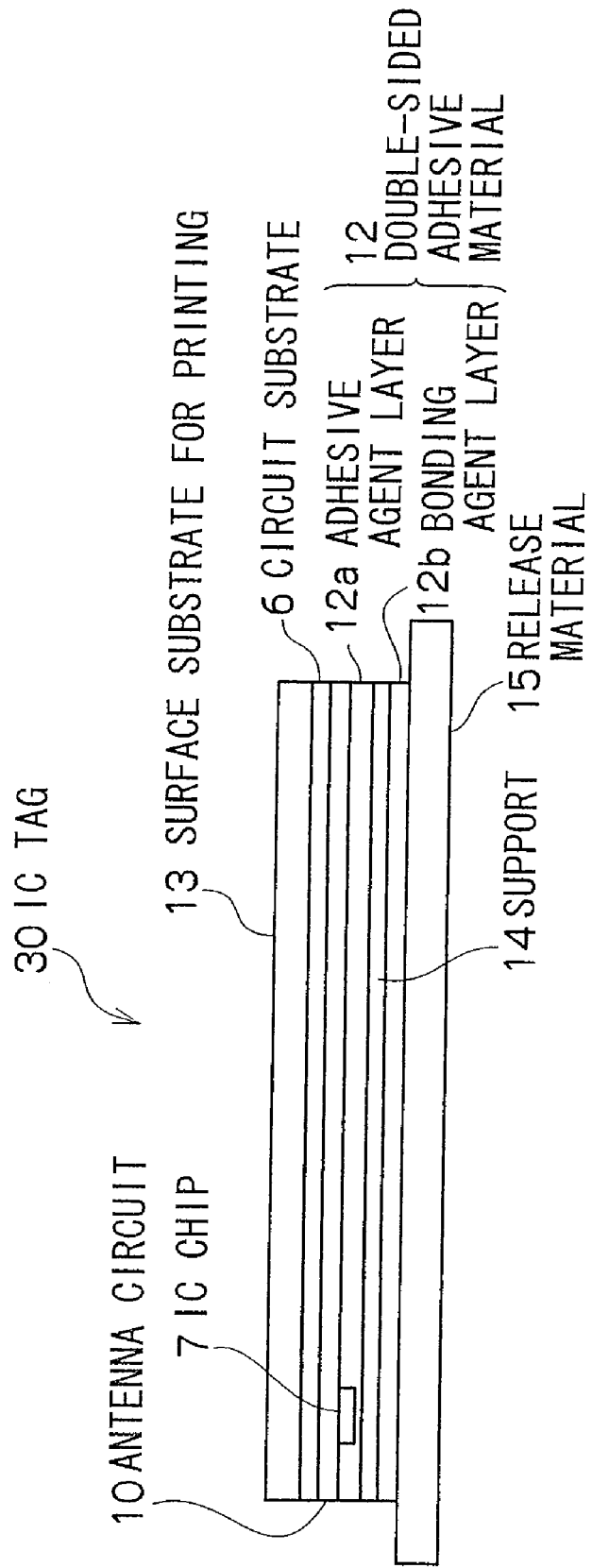
FIG. 6 is a sectional view of the IC tag in accordance with the first embodiment.

FIG. 5 is a structure diagram showing the IC tag in accordance with the first embodiment. FIG. 6 is a side sectional view showing a structure of a cross section of the IC tag in accordance with the first embodiment.

The IC tag 30 is shaped like a tag obtained by applying predetermined tag processing to the IC inlet 20 shown in FIG. 2.

As shown in FIG. 6, the IC tag 30 mainly includes the circuit substrate 6, the antenna circuit 10, the IC chip 7, a double-sided pressure sensitive adhesive material 12, a surface substrate for printing 13 and a release material 15. In FIG. 6, each layer is shown to be thick for facilitating understanding. However, in fact, the whole thickness from the surface substrate for printing 13 to the release material 15 is about less than 1 mm.

The double-sided pressure sensitive adhesive material 12 is an pressure sensitive adhesive material for bonding an adherend (for example, an article such as a product) to the antenna circuit 10 in a state where the pressure sensitive adhesive material 12 is laminated on a surface of the antenna circuit 10. The double-sided pressure sensitive adhesive material 12 includes a support 14, a pressure sensitive adhesive agent layer 12a and a bonding agent layer 12b. As a modification, the double-sided pressure sensitive adhesive material 12 may include a single pressure sensitive adhesive agent layer without the support 14 and the bonding agent layer 12b.

For example, the support 14 forming the double-sided pressure sensitive adhesive material 12 may be made of synthetic resin film, paper, nonwoven fabric or the like. For example, when the synthetic resin film is used, various materials for the film including polyethylene terephthalate, polypropylene, polyvinyl chloride, polyurethane and polyimide may be employed. A thickness of the support 14 made of such material is preferably, 5 to 100 μm, and more preferably 10 to 80 μm.

The pressure sensitive adhesive agent layer 12a is a layer which is formed on one surface of the support 14 and seals the antenna circuit 10 and the mounted IC chip 7, following irregularity thereof. The material of the pressure sensitive adhesive agent layer 12a is not specifically limited and various materials can be employed as long as the pressure sensitive adhesive agent layer 12a has enough adhesion/adhesive force to bond the IC chip 7 and the antenna circuit 10 on the support 14. For example, rubber-based, acrylic-based, silicone-based and polyurethane-based pressure sensitive adhesives may be used. Especially, acrylic-based pressure sensitive adhesives are excellent in adhesion/adhesive force. A thickness of the pressure sensitive adhesive agent layer 12a is preferably 5 to 100 µm, more preferably 10 to 70 µm.

The bonding agent layer 12b is a bonding agent layer which is formed on the other surface of the support 14 and bonds the IC tag 30 to the adherend (for example, an article such as a product). To protect the bonding agent layer 12b, the release material 15 is formed on the surface of the bonding agent layer 12b. As long as the bonding agent layer 12b enables the IC tag 30 to be bonded to the adherend, various materials for the bonding agent layer 12b can be used. For example, rubber-based, acrylic-based, silicone-based and polyurethane-based pressure sensitive adhesives may be used. A thickness of the bonding agent layer 12b is preferably 5 to 100 µm, more preferably 10 to 70 µm, like the thickness of the pressure sensitive adhesive agent layer 12a.

The release material 15 serves to protect the bonding agent layer 12b. It is preferable to form a release agent layer on the surface contacting the bonding agent layer 12b as necessary. For example, paper such as polyethylene laminated paper, coated paper and glassine paper and a synthetic resin film made of polyethylene, polypropylene, polyethylene terephthalate or the like may be used as the release material 15. For example, silicone-based resin, fluorine-based resin and long-chain alkyl-based resin may be used as the release agent used for the release agent layer of the release material 15. A thickness of the release material 15 is preferably 5 to 300 µm, more preferably 10 to 200 µm. A thickness of the release agent layer is not specifically limited and may be appropriately selected according to applications.

The surface substrate for printing 13 is a substrate for printing visible information such as information on a product thereon. The surface substrate for printing 13 is also a substrate formed on one surface of the IC inlet 20 as necessary to protect the IC inlet. For example, visible information including product information (e.g. product number and product name), price, bar code, pattern and mark is printed on the surface substrate for printing 13. It is preferred that a surface of the surface substrate for printing 13 has the suitability for printing. Various materials for the surface substrate for printing 13 such as synthetic resin film, synthetic paper, nonwoven fabric and paper can be used. As necessary, a layer for various types of record such as heat-sensitive record, pressure-sensitive record, thermal transfer record, laser beam record and ink jet record may be formed on the surface substrate for printing 13. The surface substrate for printing 13 may be a transparent substrate or an opaque substrate. A thickness of the surface substrate for printing 13 is not specifically limited, and is preferably 5 to 200 µm, more preferably 10 to 150 µm. The surface substrate for printing 13 can be laminated by using an adhesive such as polyethylene, polypropylene, polyester or the same adhesive as the pressure sensitive adhesive agent layer 12a. As the thickness of the pressure sensitive adhesive agent layer 12a, the thickness of these adhesives (not shown) is preferably 5 to 100 µm, more preferably 10 to 70 µm.

(A-2) Operations of First embodiment

Next, a method of manufacturing the IC tag 30 in accordance with the first embodiment and a method of adjusting the capacitance of the whole IC inlet according to an mounting position of the IC chip 7 mounted on the electrode parts of the connecting part for mounting IC chip 2 will be described.

The IC tag 30 in accordance with the first embodiment is manufactured mainly by below described first step to fifth step.

First step (conductive layer forming step): The plane coil 5 of the antenna circuit 10 and a conductive layer of the connecting part for mounting IC chip 2 are formed on a sheet material for the circuit substrate 6 simultaneously.

The conductive layer is formed by using a method of bonding a copper or aluminum foil formed in the predetermined shape of a coil by punching in advance on the circuit substrate 6 via an adhesive layer (not shown), a method of forming a metal layer on the circuit substrate 6 by ion plating, deposition or the like and then applying etching resist printing such as screen printing to the metal layer and applying an exposed portion to etching processing to form the metal layer in the shape of a coil, or a method of forming a metal paste such as a silver paste in the predetermined shape of a coil by screen printing or the like. The type of a conductive material is not limited. When the conductive layer is formed, the adhesive layer may be formed on a copper or aluminum foil in advance.

Second step (insulating layer forming step): An insulating layer forming the insulating resist 3 of the antenna circuit 10 is formed.

Any known method of forming the insulating layer can be used and the type of an insulating material is not limited. Since the area where the insulating layer is formed is small, it is easy to apply screen printing.

Third step (jumper forming step): A conductive layer forming the jumper 4 of the antenna circuit 10 is formed.

This conductive layer can be formed by printing processing using any of methods including metal paste such as screen printing and bonding of a metal foil. The type of a conductive material is not limited.

The first step, the second step and the third step are steps of forming the antenna circuit 10. Through the first step to third step, conductive layers forming the plane coil 5 and the connecting part for mounting IC chip 2 as well as the insulating resist 3 and the jumper 4 can be formed.

Fourth step (IC chip mounting step): The predetermined IC chip 7 is mounted at a predetermined position of the electrode parts of the connecting part for mounting IC chip 2 on the antenna circuit 10 by using a connecting material. Thus, the IC inlet 20 is produced.

At this time, the IC chip 7 is mounted at the predetermined position of the electrode parts of the connecting part for mounting IC chip 2 by using, for example, an IC chip mounting machine. The position of the IC chip 7 where desired resonance frequency can be obtained is searched by changing the mounting position of the IC chip 7 and the IC chip 7 is mounted at the searched position.

In this manner, when the mounted IC chips 7 having different capacitances $C_1$ are used, variation in the capacitance C of the whole IC inlet can be eliminated. Moreover, when the whole IC inlet having different capacitance C is manufactured, desired capacitance can be easily obtained by changing the mounting position of the IC chip 7.

Fifth step (tag processing step): When formation of electric circuit components and mounting are finished, surface substrate for printing is coated by use of an adhesive or a pressure sensitive adhesive. For example, there is produced to any shape such as a card, a label and a seal.

[Modifications]

Figure 7:
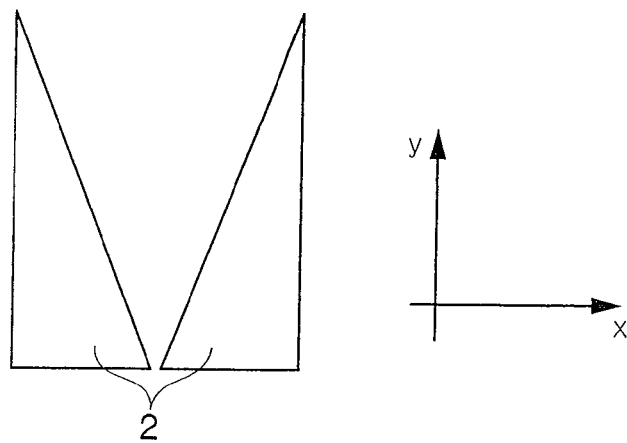
FIG. 7 is a view showing a modification of the shape of the electrode parts of a connecting part for mounting IC chip in accordance with the first embodiment (1)

Although FIG. 3 shows the shape of the electrode parts of the connecting part for mounting IC chip 2, the other shape may be adopted. FIG. 7 is a view showing a modification of the shape of the electrode parts of the connecting part for mounting IC chip 2. For example, as shown in FIG. 7, the shape of each electrode part of the connecting part for mounting IC chip 2 may be triangular. By forming each electrode part of the connecting part for mounting IC chip 2 to be triangular, the mounting position of the IC chip 7 can be adjusted so that the area of the overlap between the electrode parts of the connecting part for mounting IC chip 2 and the IC chip 7 have continuous values.

Figure 8A:
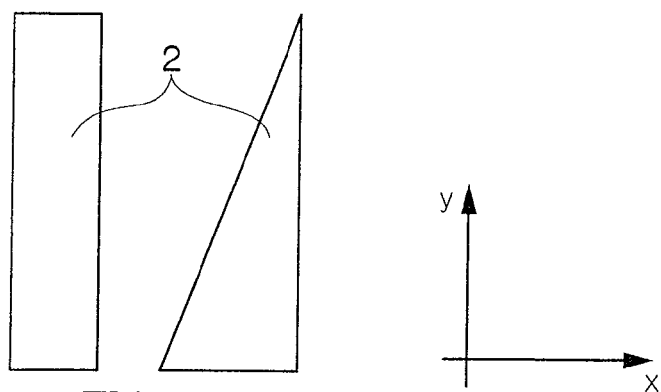
FIG. 8A is a view showing a modification of the shape of the electrode parts of the connecting part for mounting IC chip in accordance with the first embodiment (2-1)
Figure 8B:
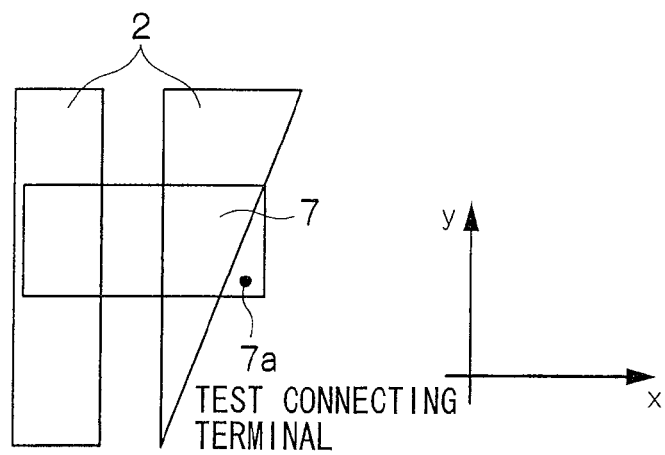
FIG. 8B is a view showing a modification of the shape of the electrode parts of the connecting part for mounting IC chip in accordance with the first embodiment (2-2)

FIGS. 8A and 8B are views showing the other modifications of the shape of the electrode parts of the connecting part for mounting IC chip 2. As shown in FIGS. 8A and 8B, the shape of the electrode parts of the connecting part for mounting IC chip 2 may be asymmetrical. Thus, the area of the overlap between both of the electrode parts of the connecting part for mounting IC chip 2 and the IC chip 7 can be adjusted by varying the mounting position of the IC chip 7 not only in the y-axis direction and put also in the x-axis direction.

Since the shape of each electrode part is made asymmetrical as shown in FIG. 8B, when a test connecting terminal 7a is formed on the IC chip 7, the test connecting terminal 7a which becomes unnecessary can be except from the connection with the electrode parts.

Figure 9A:
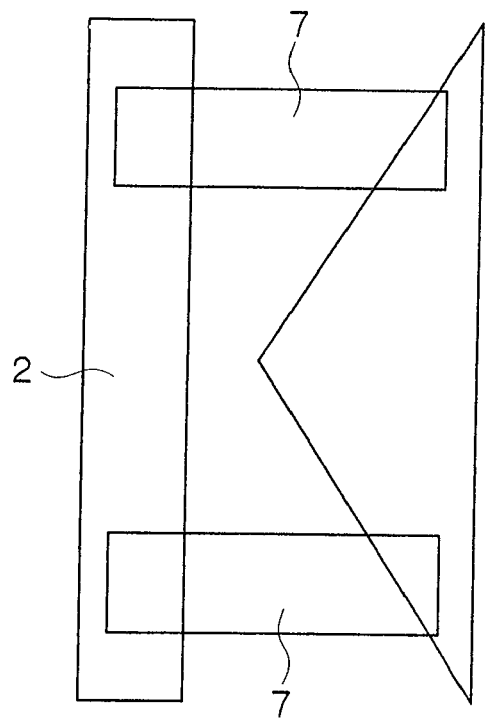
FIG. 9A is a view showing a modification of the shape of the electrode parts of the connecting part for mounting IC chip in accordance with the first embodiment (3-1)
Figure 9B:
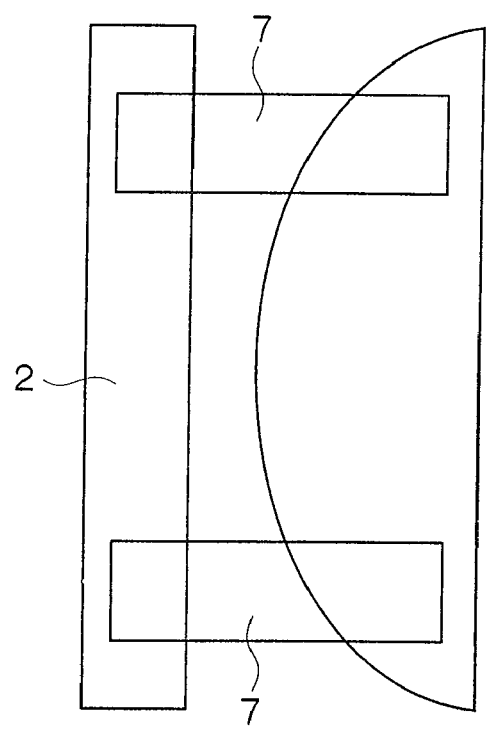
FIG. 9B is a view showing a modification of the shape of the electrode parts of the connecting part for mounting IC chip in accordance with the first embodiment (3-2)

Furthermore, FIGS. 9A and 9B shows examples of modification of the shape of the electrode parts of the connecting part for mounting IC chip 2, on which two IC chips 7 are mounted. As shown in FIGS. 9A and 9B, by making the shape of one of the electrode parts symmetrical, the mounting capacitance $C_3$ generated from the two IC chips 7 can be made identical.

In the first embodiment, when the IC chip 7 is mounted on the electrode parts of the connecting part for mounting IC chip 2, the IC chip 7 equipped with connecting terminals electrically connected to both the electrode parts is mounted. However, these connecting terminals of the IC chip 7 may be located at symmetrical positions or asymmetrical positions. Alternatively, an externally-connectable connecting terminal may be provided.

Although a circuit (one-sided circuit) is formed on only one face of the circuit substrate 6 in the first embodiment, a circuit may be formed on the other face of the circuit substrate 6 to produce double-sided circuits.

Although the plane coil 5 is shaped like a rectangle in the first embodiment, the plane coil 5 may be formed to have the other shapes according to applications. For example, the plane coil 5 may be circular, triangular, quadrangular or hexagonal. Although the antenna part is a coil antenna in the first embodiment, a dipole antenna may be used.

EXAMPLE

Subsequently, a method of producing the IC tag 30 in accordance with the first embodiment and characteristics of the IC tag 30 will be described.

First, a copper foil laminate film (manufactured by NIKKAN INDUSTRIES Co. Ltd.: product name "NIKAFLEX F-10T50C11") obtained by bonding a copper foil (35 μm in thickness) on a polyethylene terephthalate (PET) resin film (50 μm in thickness) in advance was used as the circuit substrate 6.

To form the antenna circuit on the surface of the copper foil, an etching resist pattern is printed on the surface by screen printing. At this time, the antenna circuit 10 has 32 mm in length and 61 mm in width. The plane coil 5 has 200 μm in wire width, 400 μm in spacing between adjoining wire and 7 in the number of wire turns. An excessive portion of the copper foil other than the etching resist pattern was removed by the etching to produce the plane coil 5.

The connecting part for mounting IC chip 2 was produced by etching simultaneously with formation of the plane coil 5.

Figure 10A:
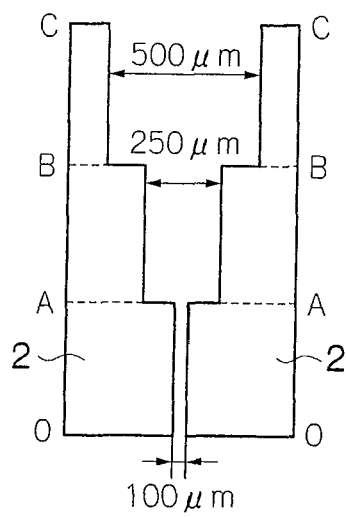
FIG. 10A is a view for describing an example of mounting of the IC chip in accordance with the first embodiment.

Here, the connecting part for mounting IC chip 2 was shaped as shown in FIG. 10A.

That is, the space between both of the electrode parts in the section from the point O to the point A was set to 100 μm, the space between both of the electrode parts in the section from the point A to the point B was set to 250 μm and the space between both of the electrode parts in the section from the point B to the point C was set to 500 μm.

Next, the insulating resist 3 of the antenna circuit 10 was formed using an acrylic resin-based insulating resist agent (manufactured by Acheson (Japan) Limited.: product name "ML25089") by the screen printing.

Furthermore, the jumper 4 of the antenna circuit 10 was formed using a silver paste (manufactured by Toyobo Co., Ltd.: product name "DW250L-1") by screen printing. Thus, the antenna circuit 10 shown in FIG. 1 is produced.

Subsequently, an RFID-IC chip 7 (manufactured by NXP Semiconductors: product name "I-CODE SLI") was mounted on the electrode parts of the connecting part for mounting IC chip 2 of the antenna circuit 10 by using a flip chip mounting machine (manufactured by Kyushu Matsushita Electric Co., Ltd.: product name FB30T-M").

Figure 10B:
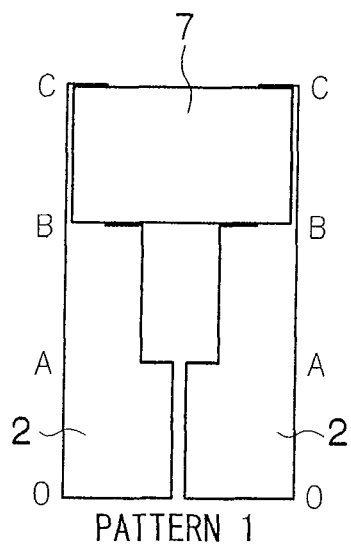
FIG. 10B is a view for describing an example of mounting of the IC chip in accordance with the first embodiment.
Figure 10C:
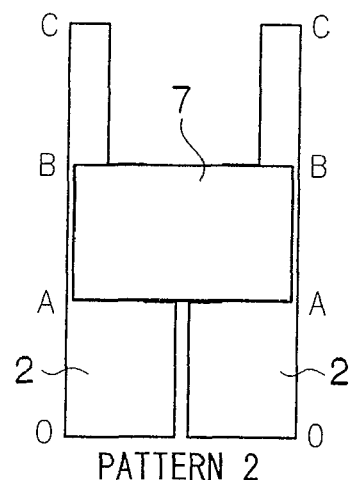
FIG. 10C is a view for describing an example of mounting of the IC chip in accordance with the first embodiment.
Figure 10D:
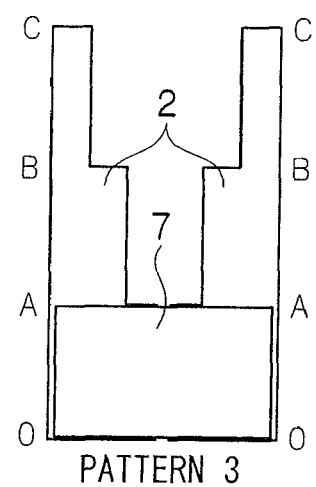
FIG. 10D is a view for describing an example of mounting of the IC chip in accordance with the first embodiment.

FIGS. 10B to 10D shows mounting patterns in the case where the IC chip 7 was mounted on the connecting part for mounting IC chip 2 while changing the mounting position of the IC chip 7. Each mounting pattern is the same as each mounting pattern shown in FIGS. 4A to 4C.

The IC chip 7 was 0.9 mm in width and 0.78 mm in length. The inductance L of the antenna circuit 10 was 5.3 μH, the capacitance ($C_1$) of the pre-mounted IC chip 7 was 23.2 pF and the stray capacitance ($C_2$) generated from the antenna circuit 10 was 1.2 pF. The distance d between the IC chip 7 and the electrode parts was 10 μm and the relative dielectric constant $\in_r$ was 2.5.

In FIG. 10B, since the area S of the overlap between the IC chip 7 and the connecting part for mounting IC chip 2 is 0.312 mm$^2$, when 0.312 is substituted into the expression (2), the mounting capacitance $C_3$ caused by mounting of the IC chip 7 becomes 0.69 pF. Thus, according to the expressions (3), (1), the resonance frequency f can be made to 13.80 MHz.

In FIG. 10C, since the area S of the overlap between the IC chip 7 and the connecting part for mounting IC chip 2 is 0.484 mm$^2$, when 0.484 is substituted into the expression (2), the mounting capacitance $C_3$ caused by mounting of the IC chip 7 becomes 1.07 pF. Thus, according to the expressions (3), (1), the resonance frequency f can be made to 13.69 MHz.

In FIG. 10D, since the area S of the overlap between the IC chip 7 and the connecting part for mounting IC chip 2 is 0.624 mm$^2$, when 0.624 is substituted into the expression (2), the mounting capacitance $C_3$ caused by mounting of the IC chip 7 becomes 1.38 pF. Thus, according to the expressions (3), (1), the resonance frequency f can be made to 13.61 MHz.

| Mounting position in FIG. 10 | Area of overlap between IC chip and connecting part for mounting (mm$^2$) | Mounting capacitance $C_3$ (pF) | Capacitance C of the whole IC inlet (pF) | Resonance frequency (MHz) |
|---|---|---|---|---|
| FIG. 10B | 0.312 | 0.69 | 25.09 | 13.80 |
| FIG. 10C | 0.484 | 1.07 | 25.47 | 13.69 |
| FIG. 10D | 0.624 | 1.38 | 25.78 | 13.61 |

The position where desired resonance frequency can be achieved was searched in this manner and the IC chip 7 was mounted at the searched position by using the connecting material. At this time, using an anisotropic conductive adhesive (manufactured by KYOCERA Chemical Corporation: product name "TAP0402E") was used as the connecting material, the IC chip 7 was mounted by thermo compression bonding at 200° C. under 300 gf for 10 sec. Thus, the IC inlet 20 shown in FIG. 2 was produced.

After mounting of the IC chip 7, the IC chip 7 and the antenna circuit 10 on the circuit substrate 6 were sealed with the double-sided adhesive material 12 (manufactured by LINTEC Corporation: product name "PET25W PAT1"). The surface substrate for printing 13 (manufactured by LINTEC Corporation: product name "FR3412-50") provided with a pressure sensitive adhesive in advance was bonded to the other face of the circuit substrate 6 and subjected to tag processing. By punching by use of a punching machine (manufactured by LINTEC Corporation: product name "LPM-300.55.D.R"), it was formed in a predetermined shape to produce the IC tag 30.

As described above, when at least one IC chip is mounted on the electrode parts, the connecting part for mounting IC chip in the first embodiment can control the area of the overlap between the electrode parts on which each IC chip is mounted and each IC chip according to the mounting position of each IC chip. As a result, when variation in the IC chip or the antenna circuit occurs and it is found out that desired resonance frequency cannot be obtained with normal mounting, desired resonance frequency can be easily corrected by changing the mounting position of the IC chip.

It is claimed:

1. An IC inlet, comprising:
   a circuit substrate;
   a pair of electrode parts formed on a surface of the circuit substrate;
   at least one IC chip mounted to the electrode parts; and
   an antenna connected to the electrode parts,
   wherein at least one of the electrode parts is configured such that, during mounting of the at least one IC chip to the electrode parts, an area of overlap between the IC chip and the at least one of the electrode parts can be adjusted by changing a mounting position of the IC chip, and
   wherein the mounting position of the IC chip is set to adjust a capacitance of the overlap between the IC chip and the at least one of the electrode parts such that a resonance frequency of the IC inlet is tuned to a predetermined frequency.

2. The IC inlet according to claim 1, wherein a spacing between the electrode parts changes along a longitudinal direction of the electrode parts.

3. The IC inlet according to claim 1 or 2, wherein the electrode parts are shaped to be symmetrical between the electrode parts.

4. The IC inlet according to claim 1 or 2, wherein the electrode parts are shaped to be asymmetrical between the electrode parts.

5. An IC tag, comprising:
   an IC inlet including:
      a circuit substrate;
      a pair of electrode parts formed on a surface of the circuit substrate, wherein at least one of the electrode parts is configured such that, when at least one IC chip is mounted on electrode parts, an area of an overlap between the IC chip and the at least one of the electrode parts can be adjusted by changing a mounting position of the IC chip;
   at least one IC chip mounted on the electrode parts; and
   an antenna unit coupled to the electrode parts,
   wherein the mounting position of the IC chip is set to adjust a capacitance of the overlap between the IC chip and the at least one of the electrode parts such that a resonance frequency of the IC tag is tuned to a predetermined frequency.

6. The IC tag according to claim 5, wherein a spacing between the electrode parts changes along a longitudinal direction of the electrode parts.

7. The IC tag according to claim 5 or 6, wherein the electrode parts are shaped to be symmetrical between the electrode parts.

8. The IC tag according to claim 5 or 6, wherein the electrode parts are shaped to be asymmetrical between the electrode parts.

9. A method of fabricating an IC inlet, comprising:
   mounting at least one IC chip to a pair of electrode parts formed on a surface of a circuit substrate,
   wherein at least one of the electrode parts is configured such that a capacitance due to an overlap of the at least one IC chip and the electrode parts can be controlled by adjusting a mounting position of each IC chip, and
   wherein mounting the at least one IC chip further comprises tuning a resonance frequency of the IC inlet to a predetermined value by adjusting the mounting position of each IC chip.

* * * * *